Aug. 13, 1946.  W. P. MASON  2,405,590
DETONATION SHIELD
Filed March 8, 1940  3 Sheets-Sheet 1

INVENTOR
W. P. MASON
BY
Ralph P. Holcomb
ATTORNEY

Aug. 13, 1946.  W. P. MASON  2,405,590
DETONATION SHIELD
Filed March 8, 1940  3 Sheets-Sheet 2
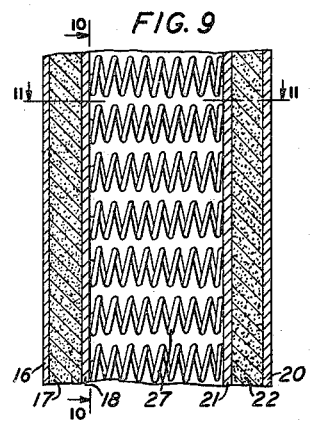
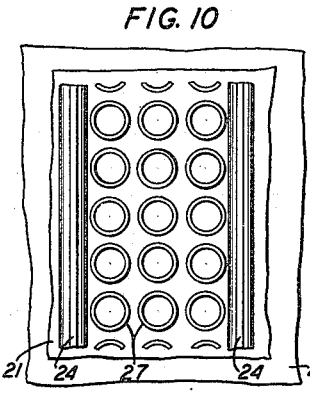
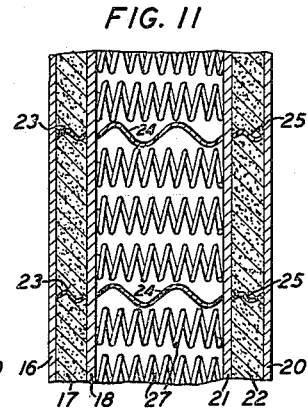
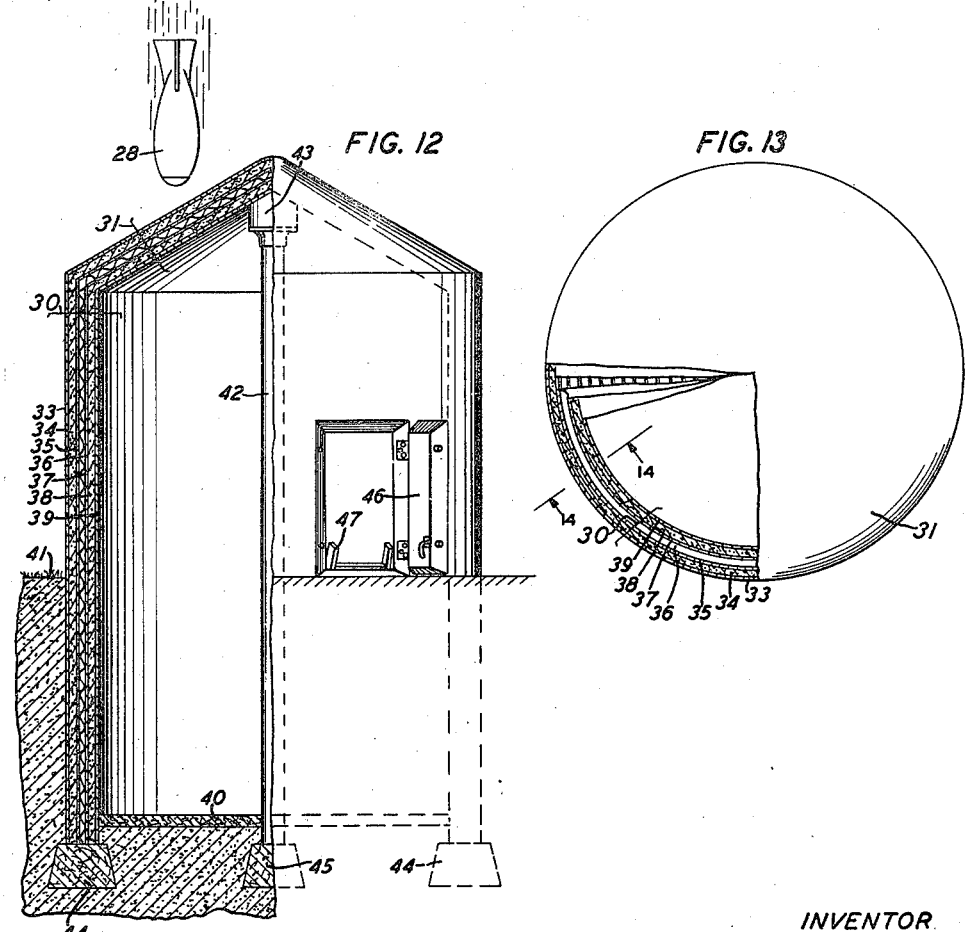
INVENTOR
W. P. MASON
BY
*Ralph T. Holcomb*
ATTORNEY Aug. 13, 1946.    W. P. MASON    2,405,590
DETONATION SHIELD
Filed March 8, 1940    3 Sheets-Sheet 3

INVENTOR
W. P. MASON
BY
Ralph T. Holcomb
ATTORNEY

Patented Aug. 13, 1946

2,405,590

UNITED STATES PATENT OFFICE 2,405,590

DETONATION SHIELD

Warren P. Mason, West Orange, N. J., assignor to Bell Telephone Laboratories, Incorporated, New York, N. Y., a corporation of New York Application March 8, 1940, Serial No. 322,865

16 Claims. (Cl. 109—81)

This invention relates to detonation shields for protection against explosions.

The principal object of the invention is to protect a vessel, shelter or other object against detonation waves resulting from the explosion of a torpedo, mine, depth charge, bomb or the like.

Other objects are to increase the effectiveness and decrease the weight and cost of detonation shields.

A further object is to armor a vessel against the effects of explosions without decreasing its buoyancy.

When an explosive such, for example, as trinitrotoluene is set off it sends out in all directions a wave of very high pressure which travels somewhat faster than the velocity of sound at steady frequencies in the medium and attenuates as sound waves do inversely with distance. When the medium is air, and to a large extent when the medium is water, the damage is caused chiefly by this high pressure wave. The more rapidly the explosive burns, the more destructive the wave becomes. In accordance with the invention there is provided an effective detonation shield designed in accordance with the principles of acoustic and mechanical wave filter theory. The shield comprises one or more portions for attenuating the components of high frequencies in the detonation wave and in tandem therewith one or more portions for attenuating the components of low frequencies. The shield is therefore very effective in dissipating all of the energy of the detonation wave to such an extent that the wave is rendered harmless to the object protected.

A dissipative granular material such, for example, as sand or gravel is capable of dissipating the large amount of energy associated with a detonation wave. Such material offers an attenuation which is high even for low frequencies and increases rapidly with an increase in frequency. The shield, therefore, comprises one or more layers of this type of material, included especially for attenuating the high frequencies The sand or other material may be held between layers of metal plates or reinforced concrete. The sand is more effective if confined in cells of comparatively small cross-sectional area. Such cells may be formed by partitions between the plates.

The low frequency energy not sufficiently attenuated by the sand is still further reduced by means of a mechanical filter which offers additional attenuation at these frequencies. Such a filter may be provided by incorporating in the shield a layer of springs the compliance of which cooperates with the mass of the sand and the other elements to produce the desired attenuation. The springs may be provided by corrugated sheet metal or they may be of the coil type or any other suitable type.

When used for the protection of a vessel or other water craft the detonation shield preferably covers the entire hull to a point above the water line. If desired the backing plate of the shield may constitute part of the outer plate of the hull. Corrugated metal partitions may be used to form bulkheads. The various layers may be so proportioned that the shield will float in water and will, therefore, not decrease the buoyancy of a vessel when applied thereto. This is a particularly important feature when the shield is to be added to an unarmored vessel already built.

Also in accordance with the invention two layers of metal and an interposed layer of sand or other dissipative granular material may be proportioned in thickness to provide a shield of minimum weight per unit area for protection against a detonation wave set up by the explosion of a charge of given weight. This feature is of importance when the shield is used for a vessel because it is usually desirable to keep the weight of the armor at a minimum relative to the protection afforded.

The principles of the invention may also be applied in the design of the walls and roof of a bomb-proof structure such, for example, as an air raid shelter. In this application all of the supporting layers may be metal plates, all may be reinforced concrete or part may be of one type and part of the other. One or more interposed layers of sand or similar material are also used and, in the preferred embodiment, a layer of springs.

The nature of the invention will be more fully understood from the following detailed description and by reference to the accompanying drawings, of which Fig. 1 is a cross-sectional view of the hull of a vessel to which a detonation shield in accordance with the invention has been applied;

Figs. 9, 10 and 11 are respectively a cross-sectional view, a side view and a top view of a fragment of a shield similar to the one shown in Figs. 3, 4 and 5 except that the corrugated metal springs have been replaced by coil springs;

Fig. 12 is a sectional view of a bomb-proof shelter with walls and roof constructed in accordance with the invention;

Fig. 13 is a plan view of the shelter shown in Fig. 12;

Figure 1:
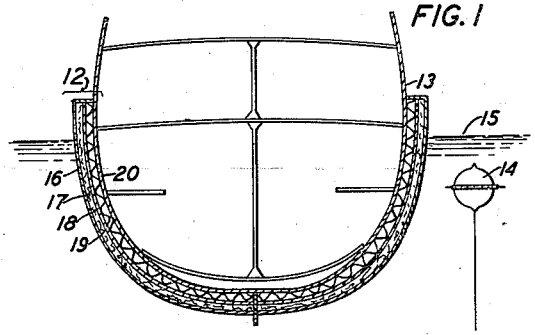

Fig. 1 shows one form of a detonation shield 12 in accordance with the invention applied to the hull 13 of a vessel to protect the vessel from a mine 14. The shield preferably covers the entire submerged portion of the hull and extends for a short distance above the water line 15.

Figure 2:
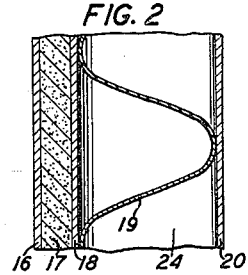
Fig. 2 is a cross-sectional view of one form of the detonation shield using a single layer of dissipative granular material and a layer of springs.

As shown to a larger scale in the cross-sectional view of Fig. 2, the shield 12 comprises an outer metal plate 16, a layer of sand, gravel or other dissipative granular material 17, an intermediate metal plate 18, a layer of corrugated metal springs 19, and a metal backing plate 20. As shown in Fig. 1 the backing plate 20 may form part of the outer plate of the hull of the vessel. The shield 12 may be made water-tight and the thicknesses of the layers so proportioned that the shield as a whole will have approximately the same average density as water. Under these conditions the shield will float in water. Such a shield may, therefore, be attached to a vessel without decreasing the buoyancy of the vessel.

Figure 3:
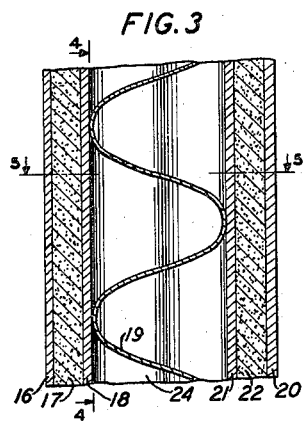
Figs. 3, 4 and 5 are respectively a cross-sectional view, a side view and a top view of a fragment of another form of the shield comprising two layers of dissipative granular material.
Figure 4:
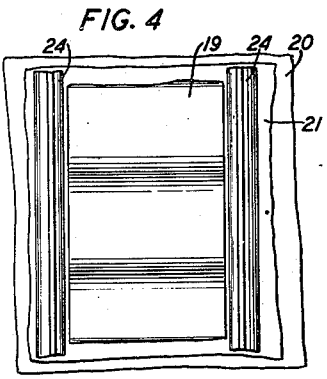
Figure 5:
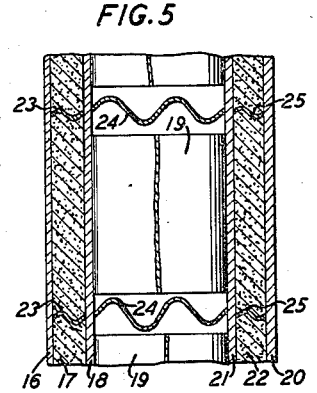

Fig. 3 shows a cross-sectional view of another form of detonation shield for the protection of the hull of a vessel in the manner shown in Fig. 1. The shield of Fig. 3 is similar to the one shown in Fig. 2 except that a second intermediate metal plate 21 and a second layer of sand or similar material 22 are included in order to give added protection. As shown more clearly in Fig. 4, a side view taken along the line 4—4 of Fig. 3 and in Fig. 5, a top view taken along the line 5—5, vertical partitions such as 23, 24 and 25 may be included between adjacent metal plates to divide the various layers of the shield into separate water-tight compartments. These partitions are preferably made of corrugated metal so as not to restrict the movement of the plates relative to each other. The shield will have substantially the same average density as water if the outer plate 16 has a thickness of ⅝ inch, each of the plates 18, 20 and 21 has a thickness of two inches, each layer of sand is eight inches thick and the distance between the plates 18 and 21 forming the spring compartment is two feet. As explained hereinafter, these dimensions may, of course, be altered, depending upon the size of the charge to be protected against and the physical properties of the various layers. The dimensions given are merely representative.

Figure 6:
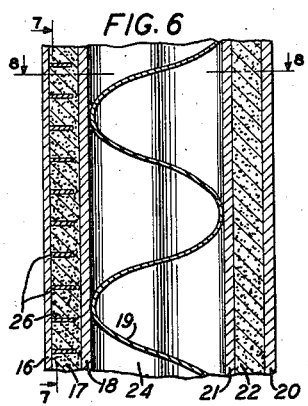
Figs. 6, 7 and 8 are respectively a cross-sectional view, a side view and a top view of a fragment of another form of the shield employing a cellular construction.
Figure 7:
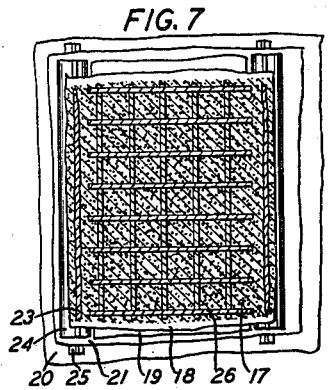
Figure 8:
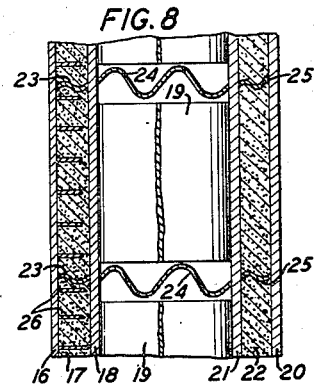

Fig. 6 is a cross-sectional view of another form of the shield which is similar to the one shown in Fig. 3 except for the addition of the partitions 26 which extend from the front plate 16 nearly to the first intermediate plate 18 to divide the space into cells. For most effective results the individual cells thus formed should have a comparatively small cross-sectional area, preferably not exceeding one square inch. Fig. 7 is a side view taken along the line 7—7 of Fig. 6 and Fig. 8 is a top view taken along the line 8—8 of Fig. 6.

Fig. 9 shows another modification of the shield of Fig. 3 in which coil springs 27 replace those of the corrupted metal type. Fig. 10 is a side view taken along the line 10—10 of Fig. 9 and Fig. 11 is a top view taken along the line 11—11.

It will be understood, of course, that the coil springs 27 may also be substituted for those of the corrugated metal type shown in Figs. 2 and 6. Also the space between the plates 16 and 18 in Figs. 2, 3 and 9 may be divided into cells by means of partitions such as 26 shown in Figs. 6, 7 and 8.

The principles of the invention may also be applied to a bomb-proof structure such, for example, as the air raid shelter shown in Fig. 12, which is an elevation partly cut away, and Fig. 13 which is a plan view. A bomb 28 is shown approaching the shelter. As illustrated, the shelter has a circular floor plan and a conical roof. The walls 30 and the roof 31 have the construction shown in greater detail in the cross-sectional view of Fig. 14 comprising an outer metal plate 33, two intermediate metal plates 35 and 37, a metal backing plate 39, an outer layer of sand 34 between the plates 33 and 35, an inner layer of sand 38 between the plates 37 and 39 and a layer of corrugated metal springs 36 between the intermediate plates 35 and 37. The floor 40 is placed several feet below the ground level 41 and the roof is supported by a heavy central steel column 42 which has a concrete cap 43. The wall is set on a concrete foundation 44 and the central column has a concrete footing 45. The shelter has an entrance which may be closed by the door 46 having beveled sides and a ladder 47 is provided to facilitate ingress and egress.

Figure 15:
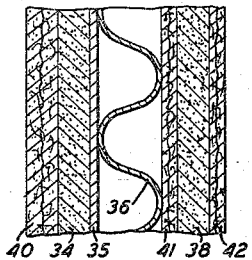
Figs. 14, 15 and 16 are cross-sectional views of different forms of the walls and roof of the shelter shown in Figs. 12 and 13.
Figure 16:
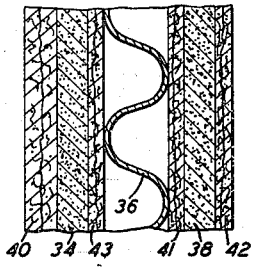
Figure 14:
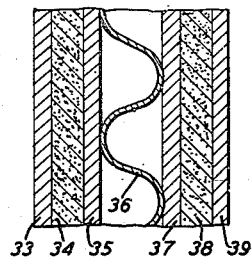

As a modification of the wall construction of Fig. 14 one or more of the metal plates may be replaced by layers of concrete, preferably reinforced with steel mesh. As shown in the cross-sectional view of Fig. 15, for example, the outer plate 33, the intermediate plate 37 and the backing plate 39 may be replaced, respectively, by the reinforced concrete layers 40, 41 and 42. Under certain circumstances it may be desirable to replace all of the steel plates by layers of concrete, as shown in Fig. 16. The construction shown in Fig. 16 is the same as that shown in Fig. 15 except that the intermediate plate 35 is replaced by a layer of concrete 43.

Suggested thicknesses for the various layers of the wall shown in Fig. 14 are one inch for each of the plates 33 and 35, one-half inch for each of the plates 37 and 39, eight inches for each of the layers of sand 34 and 38 and a spacing of eight inches for the spring compartment formed between the two intermediate plates. In Fig. 16 each of the concrete layers 40 and 43 may be two inches thick and each of the other concrete layers may be one inch thick. These dimensions are, of course, to be taken only as representative, and may be altered within wide limits to suit particular circumstances. The springs 36 in Figs. 14, 15 and 16 are shown as made of corrugated metal but it is to be understood that coil springs, such as 27 in Fig. 9, or springs of any other suitable type, may be substituted therefor in any of these figures.

The principles on which the invention is based will now be considered briefly. The pressure diagram of a detonation wave shows a very sharp increase in pressure with time followed by a rapid decrease as the energy is communicated to the surrounding medium. A Fourier analysis of this pressure wave shows that a large part of the energy is carried by quite high frequencies. Therefore, in order to dissipate the energy a medium is required which will provide high attenuation at high frequencies. A layer of loose particles of a dissipative granular material such as sand or gravel has been found to be the cheapest and most satisfactory for this purpose.

Figure 17:
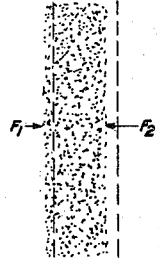
Fig. 17 is a diagrammatic representation of an elemental layer of dissipative granular material.

The attenuating properties of sand or other similar material may be investigated most conveniently by a consideration of its equivalent electrical circuit. Fig. 17 represents an end view of an elemental layer of sand assumed to be centrally located in a completely filled, long, open-ended tube of large cross-sectional area. On one surface the layer of sand is acted upon by a uniformly distributed force $F_1$ which represents the pressure exerted by a detonation wave traveling through the sand from one end of the tube to the other. The movement of the layer is resisted on the other side by a force $F_2$ exerted by the succeeding layers of sand but the layer may be displaced to the new position indicated by the dotted lines.

Figure 18:
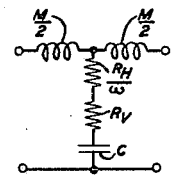
Fig. 18 is an equivalent electrical circuit for the layer shown in Fig. 17 used in explaining the invention.

Fig. 18 represents diagrammatically the equivalent T-network for the layer of sand of Fig. 17 under the conditions set forth. The series arms of the network consist of two equal reactances $$\frac{M}{2}$$

each representing half of the mass of the layer of sand. The interposed shunt branch comprises a compliance C which is the compliance (inverse of stiffness) of the layer of sand, a resistance $R_V$ which represents the viscous resistance of the sand and is constant with frequency and a second resistance $$\frac{R_H}{\omega}$$

which is inversely proportional to the frequency $$\frac{\omega}{2\pi}$$

and represents the hysteresis resistance due to the fact that sand after compression will not return to its original volume. In the equivalent electrical circuit of Fig. 20 the symbol for inductance is used for $M/2$ and the symbol for capacitance is used for C because in the mechanical analogy mass corresponds to inductance and compliance corresponds to capacitance. For similar reasons the resistance symbol is used for $R_H/\omega$ and $R_V$.

The attenuation A in napiers per centimeter for a layer of dissipative granular material of thickness $l$ is given in terms of the above-defined quantities by the following equation:

$$A = \frac{\omega}{l}\sqrt{\frac{\frac{MC}{2}[\sqrt{1+C^2(R_H+\omega R_V)^2}-1]}{1+C^2(R_H+\omega R_V)^2}}$$

The values to be used for M, C, $R_V$ and $R_H$ depend both upon the material employed and the pressure to which it is subjected. For sand the attenuation in napiers per centimeter plotted against frequency for detonation waves having average pressures of 300, 1000, 2500, 10,000 and 25,000 pounds per square inch is shown by the solid line curves 50, 51, 52, 53 and 54, respectively, of Fig. 19. The attenuation is roughly proportional to frequency, and is higher for the lower pressures because the effect of friction becomes greater. At the lower pressures the resistance due to hysteresis accounts for a larger part of the loss while at the higher pressures the viscous resistance is more important. Attenuation characteristics for other materials and for other pressures may be obtained by making the appropriate substitutions in the above equation.

Figure 19:
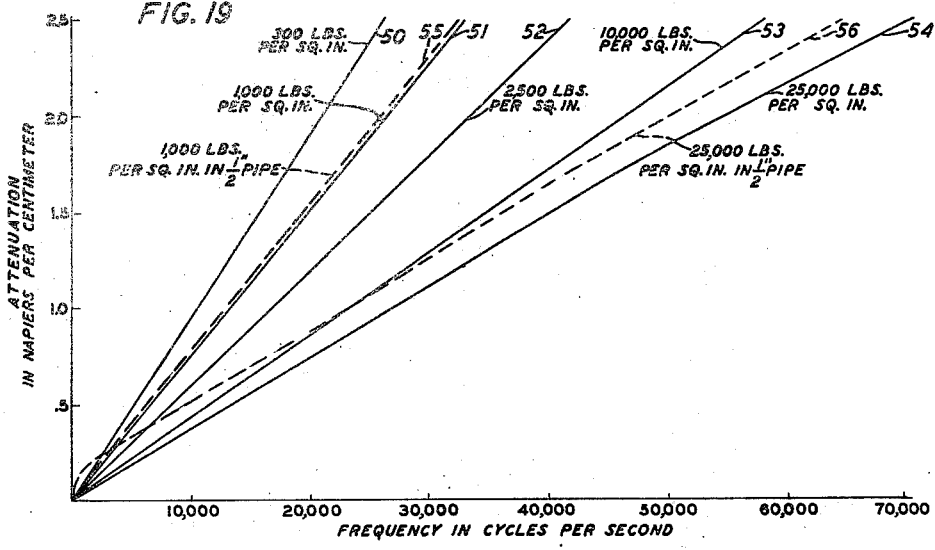
Fig. 19 shows curves giving the attenuation of sand for detonation waves of various average pressures plotted against frequency.

If the sand is confined to cells of comparatively small cross-sectional area, as shown in Figs. 6, 7 and 8, the attenuation will be increased at all frequencies and for all pressures. The equivalent circuit for this case is the same as that shown in Fig. 18 except that a resistance must be added in series with each mass $$\frac{M}{2}$$

to take account of the viscous resistance which opposes the translation of the elemental layer as a whole. The magnitude of the added resistance is directly proportional to the square of the perimeter of the cross-section of the cell and inversely proportional to the area. The dotted curves 55 and 56 of Fig. 19 give the attenuation-frequency characteristics for sand confined in a pipe of one-half inch inside diameter for average pressures, respectively, of 1000 and 25,000 pounds per square inch. At the lower pressures the added attenuation is small. At the higher pressures, however, a comparison of curves 54 and 56 shows that the increase in attenuation is considerable, especially at the lower frequencies. In practice it is found desirable to keep the cross-sectional areas of the cells comparatively small, preferably under one square inch.

It should be pointed out that the energy attenuation of a detonation wave by a layer of sand is not the same as the pressure attenuation. This is due to the fact that, as shown by the curves of Fig. 19, the sand offers higher pressure attenuation to the higher frequencies than to the lower frequencies. Therefore, as the wave travels through the sand the higher frequencies are absorbed, leaving the lower frequencies as the predominant ones. Also, since a pressure wave of lower frequency lasts for a longer time, it delivers more energy to the backing plate and hence the energy attenuation is less than the pressure attenuation. It follows then that, as the predominant frequencies are progressively lowered, a thicker and thicker layer of sand is required to effect a given energy reduction.

Figure 20:
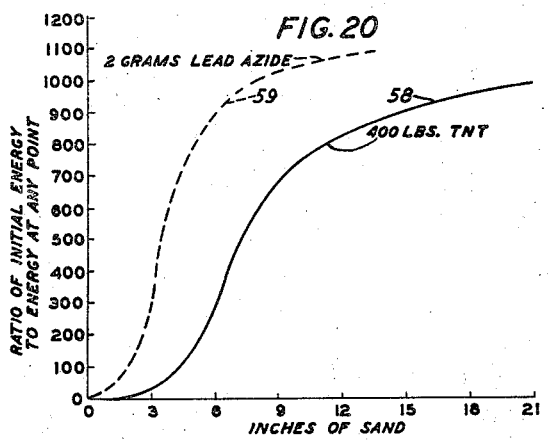
Fig. 20 shows representative curves giving the ratio of the initial energy to the energy at any point for a detonation wave passing through a layer of sand.

The facts just discussed are illustrated by the curves of Fig. 20, which give the ratio of the initial energy to the energy at any point for a detonation wave traveling through a layer of sand, the thickness of which is given by the abscissas. The solid line curve 58 relates to the wave set up by the explosion of a 400-pound charge of trinitrotoluene. It will be noted that the curve rises slowly up to about the three-inch point, then rises sharply from there to about the twelve-inch point, above which it gradually flattens out. It is apparent that for this type of explosion a three-inch layer of sand is not very effective in the matter of energy reduction, but a twelve-inch layer effects a reduction of over 800, while an additional nine-inch layer reduces the energy by less than 200. For lighter charges the predominant frequencies are higher and a thinner layer of sand is required for a given energy reduction. The dotted curve 59, for example, relates to a two-gram charge of lead azide. The curve is of the same type as is curve 58 but the steeply rising portion now falls between the one-inch and three-inch points. In practice, therefore, the layer of sand is usually made between two and twelve inches in thickness, and the preferred thickness lies between four and nine inches.

It will now be pointed out how a detonation shield of minimum weight per unit area may be constructed. It is assumed that the shield comprises two layers of metal plates with an intervening layer of sand and is to be used to protect a vessel against a torpedo containing a 400-pound charge of trinitrotoluene. The forward plate is made thick enough to stop the motion of the torpedo and set off the charge. The energy in the resultant detonation wave will be transmitted through the forward plate without much reduction but, as it passes through the layer of sand, it will be reduced in accordance with curve 58 of Fig. 20. The backing plate must then be made of sufficient thickness to absorb the residual energy without rupture.

The question is, how thick to make the layer of sand. As already pointed out, a thickness of from two to twelve inches will usually be chosen. Over most of this range the energy ratio curve is rising steeply and it will be found that a given weight of sand will have greater energy absorbing power than will the same weight of armor plate. As the thickness of the layer of sand is increased, the thickness of the backing plate can be decreased and the reduction in the weight of the backing plate will be greater than the increase in the weight of the sand. However, somewhere near the upper end of this range, when the curve starts to flatten out, there will be found a point where increasing the thickness of the sand will add just as much weight as is saved by the reduction in the thickness of the backing plate. The location of this point will determine the optimum thickness of the layer of sand for a minimum weight per unit area for the shield as a whole. The thickness thus determined for the layer of sand depends, of course, upon the size of the explosive charge, the physical characteristics of the metal plates and the properties of the sand or other dissipative granular material used. If the thickness of the layer of sand is further increased, the added weight of the sand will be greater than the saving of metal in the backing plate.

As already pointed out, sand or similar material is especially effective in attenuating high frequencies. A low frequency pulse may, however, get through the layer of sand. To further attenuate the low frequencies a layer of springs, such as 19 in Figs. 1 and 2, is added to provide a low-pass mechanical filter section with low cut-off frequency. The compliance (inverse of stiffness) of the springs may be so chosen with respect to the mass of the layer of sand 17 and the plates 16 and 18 that the filter will have a cut-off below 100 cycles per second and will, therefore, effectively attenuate most of the remaining energy.

What is claimed is:

1. A detonation shield comprising an outer plate, a backing plate, a first intermediate plate, a second intermediate plate, a layer of dissipative granular material between said outer plate and said first intermediate plate, a layer of springs between said two intermediate plates, and a second layer of dissipative granular material between said second intermediate plate and said backing plate.

2. A detonation shield in accordance with claim 1 in which said dissipative granular material is sand.

3. A detonation shield in accordance with claim 1 in which said plates are made of metal.

4. A detonation shield in accordance with claim 1 in which one of said plates is made of concrete.

5. A detonation shield in accordance with claim 1 in which one of said plates is made of metal and another of said plates is made of concrete.

6. A detonation shield in accordance with claim 1 in which said dissipative granular material is sand and the thicknesses of said layers are so proportioned that said shield as a whole has an average density approximately equal to the density of water.

7. A detonation shield in accordance with claim 1 in which said springs are made of corrugated metal.

8. A detonation shield in accordance with claim 1 in which the space between two of said plates is divided into a number of water-tight compartments.

9. A detonation shield in accordance with claim 1 in which all of the spaces between said plates are divided into water-tight compartments.

10. A detonation shield in accordance with claim 1 in which the space occupied by said dissipative granular material is divided into cells each of comparatively small cross-sectional area.

11. A detonation shield in accordance with claim 1 in which said dissipative granular material is sand and the space occupied by said sand is divided into cells each of comparatively small cross-sectional area.

12. A detonation shield in accordance with claim 1 in which the space occupied by said dissipative granular material is divided into cells each of comparatively small cross-sectional area and the space between said two intermediate plates is divided into a number of water-tight compartments.

13. A detonation shield in accordance with claim 1 in which said springs are made of corrugated metal, the space occupied by said dissipative granular material is divided into cells each of comparatively small cross-sectional area and the space between said two intermediate plates is divided into a number of water-tight compartments.

14. A detonation shield in accordance with claim 1 in which said plates are made of metal, said springs are made of corrugated metal, the space occupied by said dissipative granular material is divided into cells each of comparatively small cross-sectional area and the space between said two intermediate plates is divided into a number of water-tight compartments.

15. A detonation shield in accordance with claim 1 in which said plates are made of metal, said springs are made of corrugated metal, said dissipative granular material is sand, the space occupied by said sand is divided into cells each having a comparatively small cross-sectional area and the space between said two intermediate plates is divided into a number of water-tight compartments.

16. A detonation shield in accordance with claim 1 in which said plates are made of metal, said springs are made of corrugated metal, said dissipative granular material is sand, the space occupied by said sand is divided into cells each having a comparatively small cross-sectional area and the space between said two intermediate plates is divided into a number of water-tight compartments, said shield as a whole having an average density approximately equal to the density of water.

WARREN P. MASON.